(12) United States Patent
Berube et al.

(10) Patent No.: US 6,585,822 B2
(45) Date of Patent: Jul. 1, 2003

(54) KAOLIN CLAY GLOSSING PIGMENT AND PREPARATION THEREOF

(75) Inventors: Richard R. Berube, Holmdel, NJ (US); Michael G. Londo, Macon, GA (US); Sathanjheri A. Ravishankar, Macon, GA (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/755,259

(22) Filed: Jan. 5, 2001

(65) Prior Publication Data

US 2002/0129741 A1 Sep. 19, 2002

(51) Int. Cl.$^7$ ............................................. C04B 14/10
(52) U.S. Cl. ..................... 106/486; 106/416; 106/468; 106/487; 162/135; 162/137; 162/181.8; 428/211; 428/511
(58) Field of Search ................................. 106/416, 468, 106/486, 487; 162/135, 137, 181.8; 428/211, 511

(56) References Cited

U.S. PATENT DOCUMENTS 5,997,625 A * 12/1999 Londo et al. ............... 106/412
6,150,289 A * 11/2000 Chen et al. ................. 106/486

* cited by examiner

*Primary Examiner*—C. Melissa Koslow
*Assistant Examiner*—Shalie Manlove
(74) *Attorney, Agent, or Firm*—Raymond F. Keller

(57) ABSTRACT

Novel nanosized kaolin clay particles are prepared by agitating a fine particle size fraction of kaolin clay in a Netzsch mill until the particle size is reduced, aspect ratio is decreased and surface area is increased. The ultrafine kaolin particles are especially useful as a pigment to provide high surface gloss to ink jet printing papers.

14 Claims, 3 Drawing Sheets

Comparison of Aspect Ratios Distribution

KAOLIN CLAY GLOSSING PIGMENT AND PREPARATION THEREOF

FIELD OF THE INVENTION

This invention relates to kaolin clay pigments and to the production thereof. In particular, the invention relates to a novel scheme for processing kaolin clay that results in unique ultrafine (nanosized) kaolin clay particles that have a smooth surface and have a substantially round shape. The invention relates also to the use of the new clay pigments in producing quality ink jet printing paper.

RELATED ART

It is known that surface characteristics of paper (or any other printing surface) play a large role in how ink will be received and appear after application to the printing surface. Thus, varying print appearances can be expected depending on whether the surface ink is being applied to is uncoated or coated. Printing on uncoated paper results in low quality printing while printing on coated paper results in a higher quality print albeit of varying quality according to the nature of the paper coating compositions.

Kaolin clay is widely used, and has been used for many years, as a pigment to coat various paper products. In general, finer size fractions of kaolin clay are used to coat paper when a high gloss surface finish is desired. Coarser fractions, including delaminated grades, are used when opacification is sought. Typically, #2 coating clays are about 80% by weight finer than 2 microns; #1 coating clays are typically about 90% by weight finer than 2 microns; fine high glossing (FHG) clays are about 50% finer than 0.5 microns. These sizes are conventionally measured by sedimentation techniques; these measurements assume a spherical shape although fine particle size kaolin particles, especially those finer than 2 microns are platy and not spherical.

Kaolin products tend to have a wide distribution of sizes within a designated range. This is referred to as a "polydisperse particle size distribution." For example, in the case of commercial FHG kaolin pigments, the finest grades may contain many particles in the range of 0.3 to 2 microns although median size is about 0.3 microns.

It is well known that particle size distribution has a significant effect on the properties of the kaolin pigment as well as the utility in printing by conventional means such as rotogravure. More specifically narrow particles size distribution is known to affect particle packing. Narrow particle size distribution influences the porous structure of the coating, resulting in enhanced performance and often improves the printability. However, narrow particle size is frequently associated with undesirably high viscosity. To the best of our knowledge, narrowing of particle size distribution has been utilized with conventional coating clay fractions, delaminated and nondelaminated, especially these intended for use in gravure printing.

The particle shapes of kaolin pigments vary depending among other things on the clay source and processing, especially processing that is reflected in particle size distribution. Thus, individual clay platelets are typically flat particles finer than 2 microns (determined by sedimentation). Aggregates of kaolin clay platelets tend to have a higher ratio of diameter to thickness. Mechanical or chemical delamination of kaolin (originally composed of stacks of individual platelets) results, as expected, in an increase of the diameter thickness ratio. The ratio of diameter to thickness is conventionally referred to as "aspect ratio". In some cases, aspect ratio is calculated from sedigraphic data.

With the advance of transmissions electron microcopy (TEM), aspect ratios of kaolin can be measured with better accuracy and for fine particles such as the one described in this invention aspect ratios were determined by the method as stated in the reference "Kaolin Aspect Ratios Determined by Automated Microscopy and Electron Energy Loss Spectroscopy" by Vanderwood et al. In Process Mineralogy XIII, The Minerals, Metals & Materials Soc. 1995. The method involves image acquisition and analysis techniques to determine the platelet diameters, combined with parallel electron energy loss spectroscopy to measure thickness of the same platelets. In this method, kaolin samples were dispersed, deposited on a TEM (Transmission Electron Microscope) grid and allowed to dry. The TEM grid loaded with kaolin particles was then examined under TEM and several hundreds of particles were imaged and their average diameter determined under computer control. The samples and their images were then transferred to a transmission electron microscope equipped for Parallel Electron Energy Loss Spectroscopy (PEELS). Previously sized particles were then subjected to PEELS analysis, and the degree of electron scattering for each particle was recorded. A calibration curve of the electron scattering vs. particle thickness was used to determine the particle thickness from PEELS data. All the data were then subjected to off-line statistical analysis for the summarization and presentation of results.

One of the newest uses of specialty coated paper is in modern ink jet paper. This is a uniquely demanding application where quality paper is sought, especially when multicolor printing is used. Matte or low gloss coated paper for ink jet printing are produced by applying porous pigment particles and a binder to the paper. A recent advance in the art of ink jet pigments is described in commonly assigned U.S. Pat. No. 5,997,625, Londo et al and is commercially available under the trademark DIGITEX. The teachings of the '625 patent are incorporated herein by cross-reference.

In accordance with a preferred embodiment of the invention of the '625 patent, the coating pigment composition comprises:

(a) a hydrous clay; preferably hydrous kaolin clay
(b) a caustic leached calcined kaolin clay; and
(c) a porous material having a pore size of up to 100 Angstroms and a BET surface area in the range of 200 to 1000 $m^2/g$; preferably zeolite Y, wherein (a), (b) and (c) are present in relative amounts such that said pigment composition when present in a coating produces substantially equivalent ink contact angles when said coating receives more than one type of colored ink.

Advantages of the compositions of the invention of the '625 patent over the prior art porous silica include improved rheology and higher coating solids. This allows the high speed paper and coating machines to produce an ink-jet coated grade of paper not previously capable of being produced. The material described in the '625 patent also offers a substantial reduction in cost over the silica pigment. Yet another unexpected result is that this pigment requires less coatweight and binder than the conventional silica coatings. Also, acceptable coatings can be made without the need for dispersants.

Two of the more important characteristics to be controlled in color ink jet printing are depth of penetration and feathering or bleeding of the ink when applied to the paper. Too deep of a penetration results in poor color intensity. Bleeding results in poor printing definition. A further criterion is to control the contact angle of the various ink jet colors (i.e., cyan, magenta, yellow and black) in a manner that the inks will substantially have the same contact angle when applied to the coated paper. When the contact angles of the various inks are substantially the same, the appearance of the ink colors are more uniform, i.e., one color does not appear more dull or more bright than another color.

Prior to this invention, an expensive non-pigmented overcoat of an hydrophilic resin was applied to the inkjet paper to achieve gloss. The overcoat was selected to avoid interaction between the overcoat and the inks so that the ink is accessible to the receptor coated paper. One reason for using a non-pigmented overcoat is that conventional paper coatings formulated with traditional kaolin pigments and organic binders and applied to paper at conventional coating weights, can adversely affect ink-jet printability.

The increasing demand for high print quality from ink jet printers presents challenges to the coating pigment industry not encountered with the coated paper used in printing and writing paper market segments. The silicate pigment system described in the patent to Londo et al, OPTICIL—3186, meets the challenge to provide a receptor coating that is especially beneficial when multicolor printing is used. However, the full exploitation of the benefits of DIGITEX pigment and other ink receptive pigments used in ink jet printing, such as silica, awaits the development of improved TOP coatings to achieve gloss without the expense of known resin-based top coats.

SUMMARY OF THE INVENTION

One embodiment of this invention comprises a novel ultrafine kaolin pigment capable of achieving superior glossy characteristics on coated paper including ink jet paper. The new kaolin coating pigment is extremely fine. Average size is below 0.2 microns as determined by sedimentation. Thus, most if not all of the particles are nanosize. The particles achieve circularity (roundness) with an average aspect ratio of 2.8 or below, generally in range of 1 to 2, preferably as close to 1 as possible, indicating the ratio of diameter to thickness is low. Preferably, at least 90% by weight of the particles have an aspect ratio below 4 and from 10% to 50% by weight have an aspect ratio of 1 to 2. Surface area (BET method using nitrogen as adsorbate) is greater than 25 $m^2/g$. This is higher than that of known glossing grades of kaolin. Preferably, surface area is in the range of 27–30 $m^2/g$, most preferably 28–29 $m^2/g$. The novel kaolin particles, when viewed by scanning electron microscope have the appearance shown in the attached figure. The photomicrograph in the figure show that the particles are generally round and free of attached fine particles.

The kaolin pigment of this invention is especially useful as a transparent over-coated pigmented (TOP) layer that achieve the gloss comparable to currently available glossy ink jet photographic paper which contains an expensive non-pigmented over-coat of hydrophilic resin. There is no interaction between the jet inks and the TOP layer. In other words, the TOP layer does not form a barrier between the ink and the ink jet pigment coating.

A desirable feature of the new pigment is that it can be formed into a high solids (e.g., 70% solids) dispersed aqueous slurry. The high solids coating makes possible higher productivity in a paper mill because of less demand on the dryer and improved coat weight control. Conventional calendering conditions can be used for full gloss development. Another significant advantage is that the pigmented TOP coating can be applied at low coat weight (for example 1 to 4 gms/sq.m.) Use of low coat weight provides a more permeable coating layer which facilitates required penetration of the ink to the inkjet coating.

Also in accordance with this invention, a fine particle size, high purity kaolin clay fraction, preferably a bleached FHG coating clay, is dispersed in water, charged to a Netzsch disc mill with a particulate medium, preferably round silica, and processed in the mill until at least 90% by weight is finer than 0.5 micron. Multiple passes in the mill are preferably carried out to achieve the desired reduction in particle size, narrowing of particle size distribution and reduction in aspect ratio.

The Netzsch Disc Milling System, manufactured by Netzsch Inc, 119 Pickering Way, Exton, Pa. 19341 Model: LMC 60(E) SS, was used in practicing this invention. The function of the disc is to accelerate the grinding media centrifugally from the outer edge and centripetally from the inner edge of the disc. This creates shearing forces between the disc and the media. This agitation is carried to the surrounding media radially and axially by the kinetic energy imparted to the media by the disc.

A two zone spiraled jacket coats the system. Various separators are available to separate the grinding media (beads) from the product.

IN THE DRAWINGS

Figure 1:
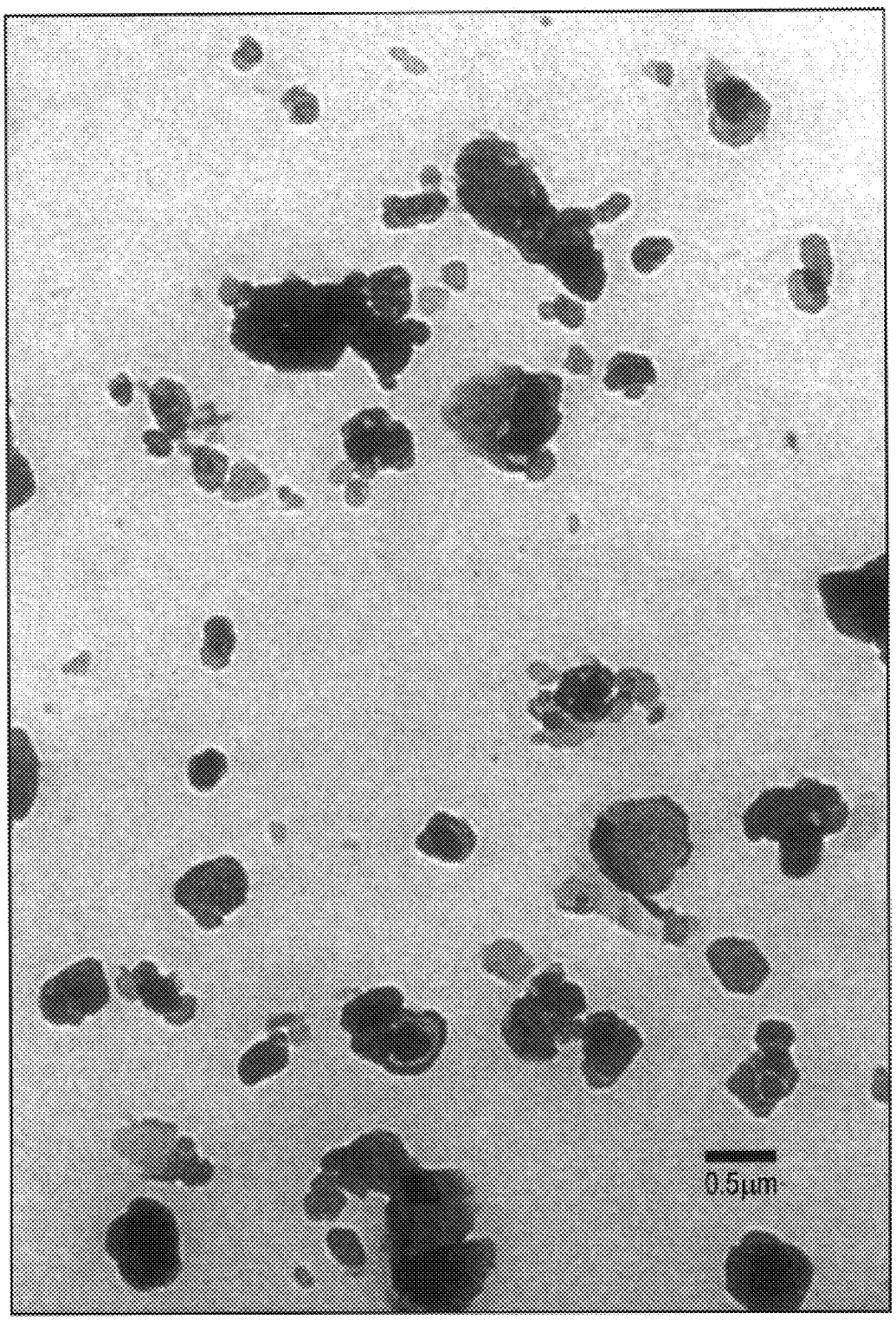
FIG. 1 is a SEM photograph of a kaolin glossing pigment of this invention, showing generally uniform, well-deagglomerated particles whose surfaces are substantially free from attached fine particles.
Figure 2:
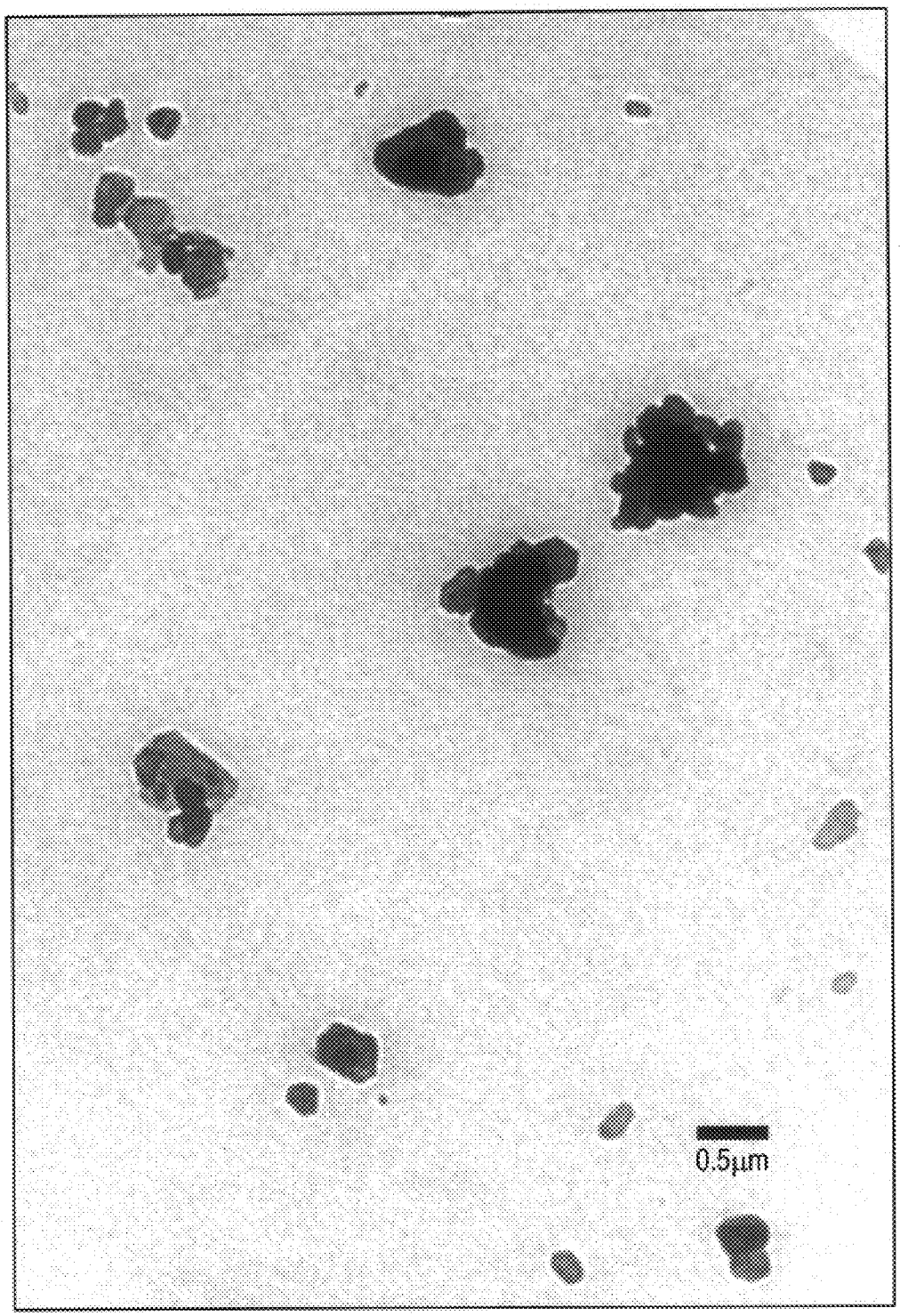
FIG. 2 is a SEM photograph of a commercial high glossing kaolin pigment (MIRAGLOSS 91) showing agglomerated particles with fine particles attached to larger particles.
Figure 3:
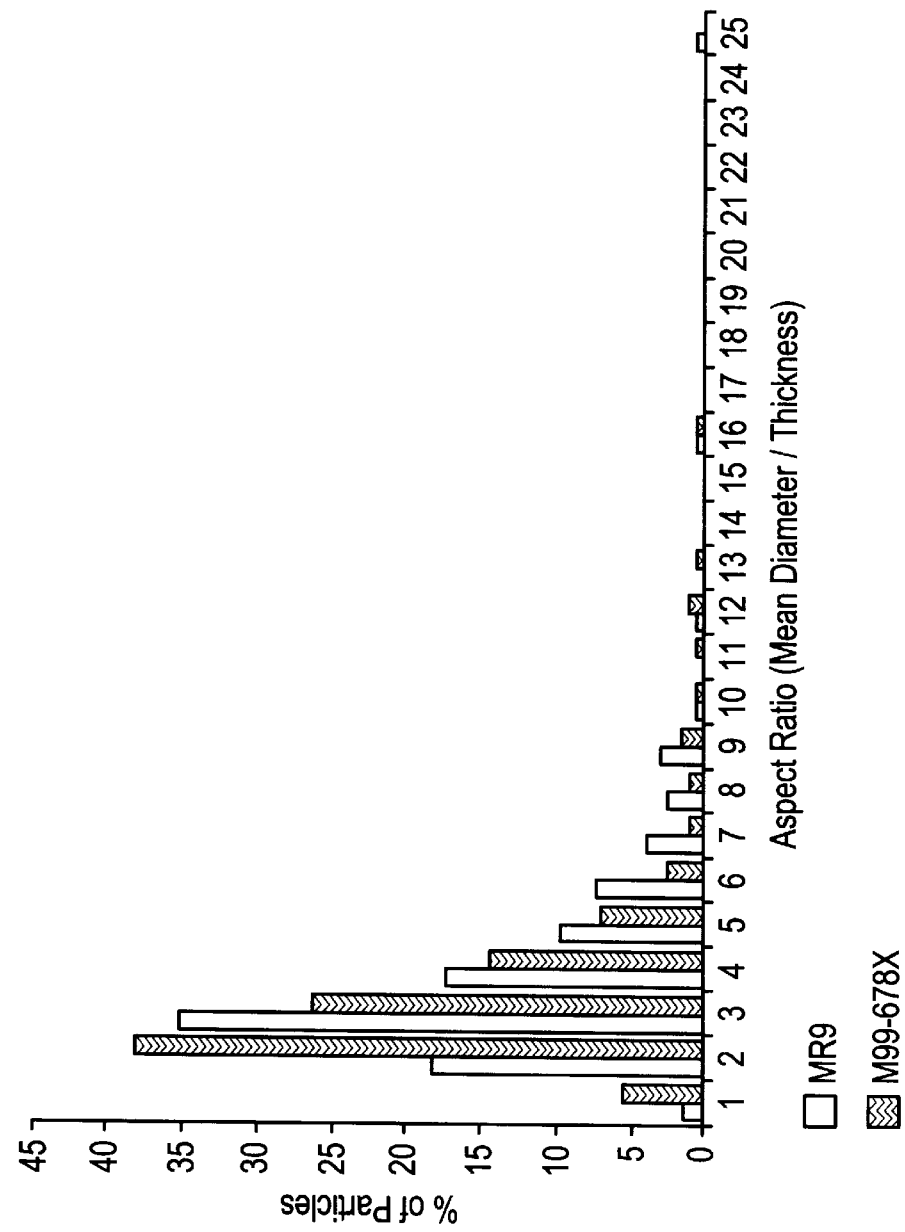

FIG. 3 is a bar chart comparing the distribution of aspect ratios of a kaolin glossing pigment of the invention (M99-678X) with that of a commercial kaolin glossing pigment (MIRAGLOSS 91), showing that the distribution of aspect ratios with variation of particle size is narrower for the pigment of the invention and that the pigment of the invention has more particles having an aspect ratio close to one (1); in other words, the particles of the pigment of the invention are rounder and more uniform.

PREFERRED EMBODIMENT OF THE INVENTION

In accordance with the invention, the starting kaolin is a fine fraction of a crude kaolin, preferably a fraction obtained after the bleaching step of conventional water washed kaolin processing. The method involves starting with kaolin material either in dry form or in slurry form (50–60% solids) comprising particles 90% below 1 micron and preferably 90% below 0.7 micron and most preferably below 0.5 micron with GE brightness varying between 86–93%. If the starting material is in dry form, it is slurried in water to 50–60% solids, preferably 52–58% solids and most preferably 53–55% solids and screened using a 400 mesh (Tyler) screen. Slurry solids are diluted to about 53% and dispersed with addition of a clay dispersant, preferably 0.25–5 #/T of low molecular weight polyacrylates (for example, Colloid 211, supplied by Vinnings Industries, GA. The dispersed slurry is then injected in to Netzsch mill. In a typical laboratory test, the volume of the Netzsch mill is 60 liters and contains spherical glass grinding media roughly 1 millimeter diameter. The amount of grinding media is roughly 85% of the volume. The first pass of the kaolin slurry is carried out at a feed rate of 0.55–0.65 GPM. The product from the Netzsch mill is collected and dispersed again with 0.5 #/T of Colloid 211. The % solids is adjusted to be between 50–53% and fed into the Netzsch mill at the rate of 0.60–0.65 GPM. During the milling operation heat is generated and the mill automatically shuts off if the temperature exceeds an optimum set temperature that is necessary to protect the inner linings of the mill. Therefore, it is necessary that the mill throughput be optimized to prevent overheating which triggers the auto shut off mechanism to achieve maximum efficacy. After a second pass through the Netzsch mill, the slurry solid is diluted to 45–50% and spray dried. Spray dried product is reslurried at 70.5% solids using a blunger, and screened through a 400 mesh screen.

Typical particle size of the kaolin fed to the Netzsch mill is 90% at 0.5 microns and 45% at 0.18 microns. Typical surface area is 21–22 Sq.m/gm. Preferably, brightness (GE) is above 85%, most preferably above 87%, and, especially preferred is 89 to 93%.

The preferred milling or grinding media is glass or silica with a diameter ranging from an average if 0.6 mm to 1 mm. Alternatively one can use slightly heavier zirconia-silica composite beads. The zirconia-silica composite bead has the density of zirconia at the core and gradually reduces to silica density value as one moves radially from core to surface of the bead. The use of heavier beads helps one to get higher through put of the feed and therefore the higher production rate. One can also use other media such as tungsten and tungsten carbide material instead of glass and zirconia-silica composite.

In the examples, all values are reported on a weight basis, unless otherwise indicated.

EXAMPLE

The starting clay was obtained as a filter cake from a commercial kaolin plant in Georgia. The filter cake had been obtained, in generally conventional manner, by degritting a blend of crude kaolins, dispersing and fractionating to approximately the following particle size distribution: 98% <2 micron and 89%<0.5 micron. This was followed by acidification and bleaching with a sodium hydrosulfite bleach. The filter cake at about 50–60% solids was dispersed by addition of 1–2 #/ton of a conventional low molecular weight sodium polyacrylate dispersant supplied under the trade name Colloid 211.

The dispersed slurry was then injected in to Netzsch mill fitted with Molinex type disc, Model 632–731. The volume of the Netzsch mill was 60 gals and contained spherical glass grinding media roughly 1 millimeter diameter. The amount of grinding media was 70–90% of the volume of the mill internal volume. The first pass of the kaolin slurry was done at a feed rate of 0.55–0.65 GPM. The product from the Netzsch mill was collected and dispersed once again with 0.5 #/T of Colloid 211. The % solids was adjusted to be between 50–53% and was fed into the Netzsch mill at the rate of 0.60–0.65 GPM. The mill was optimized for maximum efficiency on both passes, with outlet temperatures up to the limit. After a second pass through the Netzsch mill, the slurry solid was diluted to 45–50% and spray dried. Spray dried product was reslurried at 70.5% solids using a blunger, and screened through a 400 mesh (Tyler) screen. The two passes through the Netzsch mill has given some surprising results including producing much higher surface area increase compared to the starting material by producing nano particles, surface polishing and giving narrower distribution of aspect ratio besides attritioning coarse particles. This is the highest surface area natural kaolin produced by the industry.

Following is a summary of characteristics of the pigment of the invention and, for purposes of comparison, properties of a commercial glossing pigment (MIRAGLOSS 91) supplied by Engelhard Corporation.

TABLE 1

Physical properties of Pigments

|  | MIRAGLOSS 91 | Product of this Invention |
|---|---|---|
| GE Brightness | 91.5 | 91.1 |
| Surface Area (m$^2$/gm) | 22 | 28.5 |
| Particle Size (microns), e.s.d* | % Mass Finer | % Mass Finer |
| 5.00 | 100 | 100 |
| 2.00 | 99 | 99 |
| 1.00 | 98 | 99 |
| 0.50 | 89 | 93 |
| 0.30 | 68 | 76 |
| 0.20 | 50 | 59 |

*Determined by sedigraphic analysis.

The pigment of the invention was made down at 68% solids slurry without any addition of dispersant. To this slurry 2 parts per hundred (pph) of fully hydrolyzed medium molecular weight polyvinyl alcohol was added as a binder. This mixture is the coating color.

The coating color was applied to two types of commercially available premium inkjet "matte" paper with 7 and 5 points caliper (thickness). Both were coated with DIGITEX pigment) at 2gm/Sq.m (dry basis) using an automatic drawdown device (KC101 from TMI). The coated paper was then dried using hot air and subsequently placed in a convection oven maintained at 180F until the moisture in the sheets was completely removed as ensured by zero weight change between three to four consecutive measurements. Then, it was allowed to condition in a constant temperature humidity room at 72F and 50% RH for 24 hrs.

The conditioned sheets were then measured for gloss values at 75 degree reflect. The sheets were then supercalendered on a Beloit Laboratory calender Model 754 at conditions of 1200 psig (800 pli), 125F—Chrome to SLP-ERTEX. The results tabulated in Table II.

TABLE II

Gloss Improvement with Transparent Overcoat Pigment Application

| Base Stock | Gloss (As is) | Gloss (No TOP w/ Calendering) | Gloss (W/TOP No Calendering) | Gloss (W/TOP & Calendering) | Without TOP W/Cal | Gloss Development Index (GDI)* With/ TOP/ No Cal | With TOP and Cal |
|---|---|---|---|---|---|---|---|
| Inkjet paper 1 with 7 caliper | 3.4 | 12 | 16.0 | 51.6 | 2.52 | 3.7, | 14.2, |
| Inkjet paper 2 with 5 caliper | 4.2 | 12 | 13.3 | 47.6 | 1.85 | 2.2 | 10.3 |

*Gloss development Index (GDI) is calculated as follows: GDI = (Final Gloss − As is Gloss)/(As is Gloss) with Calendering The level of gloss developed before and after supercalendering papers coated a 2 gsm are unexpected.

The TOP coated and calendered papers were printed with regular print patterns using a HP895CSE printer. The color densities were measured using a COSAR 200 densitometer with polarized filter. Five readings were taken for each color from approximately 1 inch by 1 inch color block generated by the printers. The readings are taken at the four corners and the center of the color square, averaged and then recorded. The results are tabulated in Table III as shown below:

TABLE III

| | Printed Signature | | | | | | | |
|---|---|---|---|---|---|---|---|---|
| | Cyan | | Magenta | | Yellow | | Black | |
| | W/ TOP | W/O TOP | W/ TOP | W/O TOP | W/ TOP | W/O TOP | W/ TOP | W/O TOP |
| Inkjet paper with 7 caliper | 1.8 | 1.73 | 1.42 | 1.42 | 1.01 | 0.99 | 2.43 | 1.61 |
| Inkjet paper 2 with 5 caliper | 1.85 | 1.53 | 1.47 | 1.32 | 1.02 | 0.97 | 2.28 | 1.68 |
| Control | | 1.23 | | 1.25 | | 0.97 | | 2.5 |

The results indicate that the inkjet papers with TOP layer have improved color densities when compared with the uncoated inkjet papers, especially with black and cyan. This is an unexpected result owing to the fact that aluminosilicate pigmented TOP layer besides rendering the ability to increase gloss to the inkjet paper also behaves like a permeable pigment layer that facilitates better ink sorption/holdout and higher print fidelity.

TABLE IV

| | Image Density Comparison of TOP layer with Commercial Inkjet Paper | | |
|---|---|---|---|
| | Inkjet Paper 1 (7 mils) Caliper | Inkjet Paper 2 (5 mils) Caliper | Control |
| Cyan | 1.8 | 1.85 | 1.23 |
| Magenta | 1.42 | 1.47 | 1.25 |
| Yellow | 1.01 | 1.02 | 0.97 |
| Black | 2.43 | 2.28 | 2.5 |

The results shown in Table IV compare the color densities of inkjet papers with TOP layer and the commercially available resin coated inkjet paper with a gloss value of 68. It is important to note that the cyan and magenta color densities on papers with TOP layer showed significant improvements over the control (resin coated) and the yellow and black color densities are equivalent.

The principles, preferred embodiments, and models of operating of this invention have been described in the foregoing specification. However, the invention which is intended to be protected herein is not intended to be limited to the particular forms disclosed, since they are to be regarded as illustrative rather than restrictive. Variations and changes may be made by those skilled in the art without departing from the spirit of the invention.

We claim:

1. A kaolin clay glossing pigment useful for coating paper comprising individual nanosized particles of kaolin clay having an average aspect ratio below 2.5, the surfaces of said particles of kaolin being substantially free from attached fine particles.

2. The pigment of claim 1 wherein the BET surface area is at least 25 $m^2/g$.

3. The pigment of claim 2 wherein the BET surface area is in the range of 27 to 30 $m^2/g$.

4. The pigment of claim 3 wherein the BET surface area is about 28–29 $m^2/g$.

5. The pigment of claim 1 wherein at least about 90% by weight of the particles have an aspect ratio below 4 and from 10% to 50% have an aspect ratio in the range of 1 to 2.

6. An ultrafine kaolin pigment useful when coated on paper to provide a high gloss surface finish which comprises particles of hydrous kaolin clay that have an average size below 0.2 microns as determined by sedimentation and at least 50% by weight have an aspect ratio of 2.5 or below, a B.E.T. surface area above 25 $m^2/g$, the majority of said particles being further characterized when viewed by scanning electron microscope as being round and substantially free of attached fine particles.

7. The pigment of claim 6 wherein the BET surface area is in the range of 27 to 30 $m^2/g$.

8. The pigment of claim 6 wherein the BET surface area is about 28–29 $m^2/g$.

9. The pigment of claim 6 wherein at least about 90% by weight of the particles have as aspect ratio below 4 and from 10% to 50% have an aspect ratio in the range of 1 to 2.

10. The method for producing an ultra-high glossing pigment from a fine particle size high purity fractionated kaolin clay that is at least 90% by weight finer than 1 micron which comprises:

(a) forming said fine particle size fractionated clay into a dispersed, fluid aqueous slurry, (b) agitating said slurry of clay from step (a) with a particulate grinding media in an agitated disc grinding system that accelerates the grinding media centifugally from the outeredge of the disc, thereby creating shearing forces between the disc and said media, and using kinetic energy imparted to the media by the disc, (c) repeating steps (a) and (b) and recovering the resulting smoothed clay particles.

11. The method of claim 10 wherein the grinding medium is spherical glass.

12. The method of claim 10 wherein the clay from step (c) is dried and formed into a dispersed fluid slurry having a clay solids content of at least 70%.

13. Paper precoated with a matte layer of a macroporous ink jet coating pigment and having a top glossing layer comprising the kaolin pigment of claim 1.

14. Paper precoated with a layer of a macroporous ink jet coating pigment comprising a mixture of hydrous kaolin clay, caustic leached calcined kaolin clay and a zeolitic molecular sieve, and a top glossing layer comprising the kaolin pigment of claim 1.

* * * * *